No. 845,557. PATENTED FEB. 26, 1907.
E. H. LANIER & F. K. DRIESBACH.
CONFECTION BAKING APPARATUS.
APPLICATION FILED JULY 25, 1906.
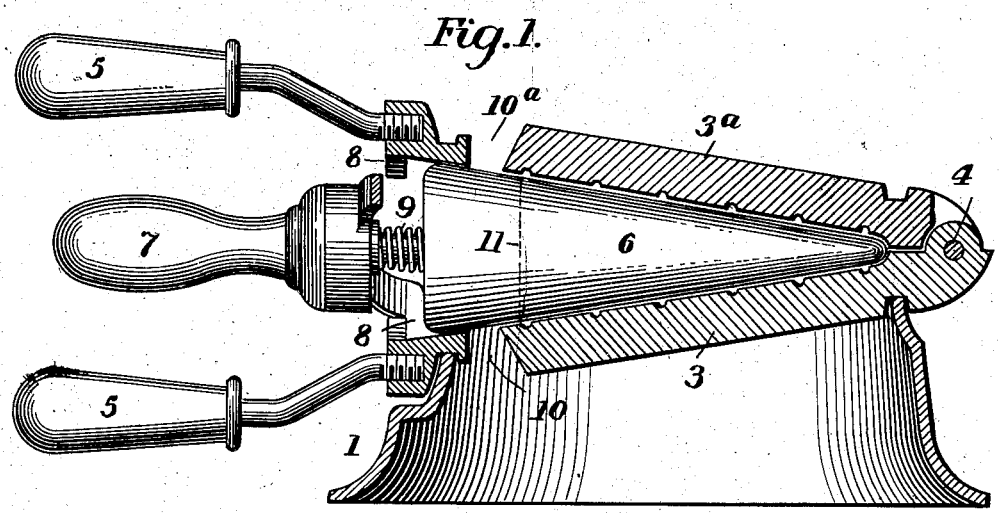
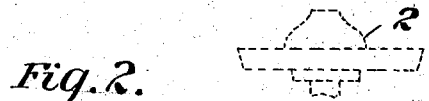
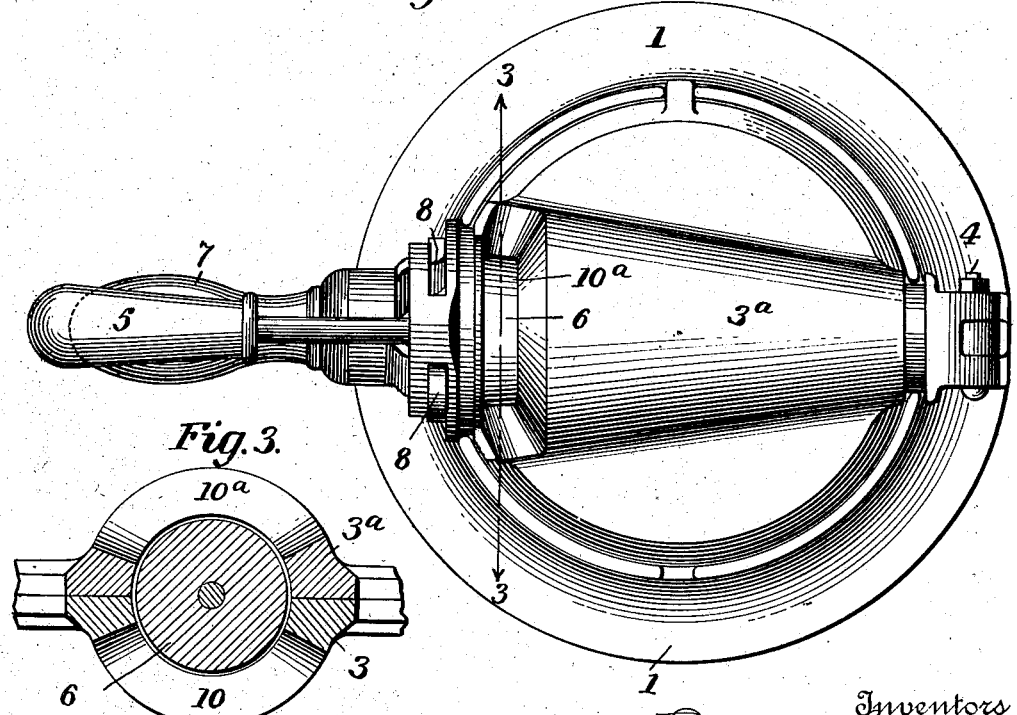

UNITED STATES PATENT OFFICE.

EDWARD H. LANIER AND FRANK K. DRIESBACH, OF CINCINNATI, OHIO.

CONFECTION-BAKING APPARATUS.

No. 845,557.    Specification of Letters Patent.    Patented Feb. 26, 1907.

Application filed July 25, 1906. Serial No. 327,740.

*To all whom it may concern:*

Be it known that we, EDWARD H. LANIER and FRANK K. DRIESBACH, citizens of the United States, and residents of Cincinnati, Hamilton county, State of Ohio, have invented certain new and useful Improvements in Confection-Baking Apparatus, of which the following is a specification.

The present invention relates to improvements in confection apparatus of the character illustrated and described in our earlier application, Serial No. 284,563, which apparatus is particularly designed for cooking or baking the container or shell of the confection known as "Parisian ice-cream cones."

In using apparatus like that illustrated in the aforesaid application it is found that as the core is surrounded throughout its length by the oven-walls and only heated by radiation from said walls it occasionally after a repeated number of operations is not heated sufficiently to insure a uniform baking of the cone—that is, after the core has been repeatedly withdrawn from the oven and dipped into the cool batter it will be chilled, so that the inner surface of the container will not be baked as thoroughly or completely as the outer surface, which is exposed to the heat of the oven-walls.

The object of the present invention is to obviate this and provide a construction by which the core will be heated not only by radiation from the oven-walls, but also by the direct action of the heating burner or stove.

In the accompanying drawings, Figure 1 is a vertical-sectional view through an apparatus constructed in accordance with the present invention. Fig. 2 is a plan view of the apparatus. Fig. 3 is a sectional view on the line 3 3 of Fig. 2.

Referring to the drawings, the apparatus comprises a base or supporting ring 1, designed to be arranged about or over a suitable heating means, such as a gasolene-burner, (conventionally illustrated at 2,) said ring or base supporting an oven comprising two similarly-shaped members 3 3$^a$, which are pivotally connected at 4 and each provided with a handle 5. The sections 3 3$^a$ of the oven are so shaped as to form between them a conical chamber into which a core 6 is adapted to extend, said core being connected with a suitable handle 7, provided with radially-projecting arms 8, adapted to engage with the walls of the oven to support the core therein. The handle 7 is connected with the body of the core 6 by means including a coiled spring 9, whereby said core-body is adapted to move longitudinally relative to the handle and oven while supported in the latter.

The parts of the apparatus hereinbefore described are similar to and operate in the manner described in the aforesaid application.

In order that the core 6 may be properly heated at all times, we provide suitable slots or apertures 10 10$^a$ in the oven-sections 3 3$^a$, whereby a portion of the core will be exposed to the direct action of the burner or heating device 2. It will be understood that the oven is mounted in the ring or base 1, so as to move about a horizontal axis and bring either section 3 3$^a$ of the oven directly above the burner 2.

In using the apparatus the core 6 is dipped into a body of suitable batter to cause a thin film or coating thereof to adhere to its body and is then inserted in the oven, where said film or coating of batter is quickly baked, when the core can be withdrawn and the pastry cone removed therefrom and afterward filled with ice-cream or other desired material. It is therefore necessary to repeatedly expose the core to the air, and it is also chilled or cooled by being dipped in the batter, and it has been found when the only means for heating said core is the heat radiated from the oven-walls that the outer surface of the pastry-cone will be more rapidly baked than the interior thereof, and therefore the cone when removed from the core will not be thoroughly and completely baked. By providing the apparatus with slots 10 10$^a$ in the oven-walls, however, a section of the core is exposed to the direct action of the heating means, and it is thus maintained at substantially the same temperature as the oven-walls, and experience has shown that we thereby insure a uniform baking of the pastry, which is of course very desirable.

It will of course be understood that in using the apparatus the core is not coated with the batter to such an extent that said coating will be exposed through the slots 10 10$^a$. Preferably the said coating will terminate substantially as indicated by the dotted line 11 in Fig. 1.

Having thus described the invention, what is claimed, and desired to be secured by Letters Patent, is—

1. The herein-described baking apparatus comprising an oven having a conical chamber and provided adjacent the larger end of said chamber with an aperture or passage that extends from the chamber through the outer face of the oven-wall which is adapted to be directly heated, and a core adapted to be inserted in the oven-chamber and extend across said aperture or passage in the wall thereof.

2. The herein-described baking apparatus comprising an oven, having a conical chamber, means for supporting the oven and permitting it to turn about a horizontal axis to expose either of two opposite sides to the direct action of a heating device, the oven being provided adjacent the larger end thereof with apertures or passages extending from its chamber through the outer faces of both said walls or sides, and a core adapted to be inserted in the oven and extend across said apertures or passages in the walls thereof.

3. The herein-described baking apparatus comprising an oven having a conical chamber and mounted to rotate about a horizontal axis, said oven having apertures or passages formed in and extending radially in opposite directions through the walls or sides thereof adjacent the larger end of its chamber, and a core adapted to be inserted in the oven and to extend across said apertures or passages in the walls thereof and provided with radially-projecting means for engaging the oven.

4. The herein-described baking apparatus comprising an oven having a conical chamber and formed of two sections hinged together, each section having therein an aperture or passage leading from the oven-chamber, adjacent the larger end thereof, through the outer face of said section, a core adapted to be inserted in said oven and extend across the aforesaid apertures or passages, and means for supporting said oven above a suitable heating means and permitting either section of the oven to be brought adjacent said heating means.

5. The herein-described baking apparatus comprising an oven mounted to rotate about a horizontal axis and comprising two sections pivotally connected and arranged to form a conical chamber, each of said sections having formed therein a passage or aperture extending from the oven-chamber, adjacent the larger end thereof through the outer face of said section, and a conical core adapted to be supported in the oven-chamber and extend across said apertures or slots.

6. The herein-described baking apparatus, comprising an oven having an open end and an aperture or passage formed in a side wall adjacent its open end, means for supporting the oven above a heating device, with its apertured side adjacent said heating device, and a core detachably supported in the oven, whereby a section of the core is adapted to be directly heated by the heating device, while the other portions thereof are heated by radiation from the oven-walls.

In testimony whereof we affix our signatures in presence of two witnesses.

EDWARD H. LANIER.
FRANK K. DRIESBACH.

Witnesses:
BERNARD M. WILLINGER,
EDWARD MAUS.